(12) United States Patent
Iwamoto

(10) Patent No.: US 12,386,161 B2
(45) Date of Patent: Aug. 12, 2025

(54) OPTICAL SYSTEM AND IMAGE PICKUP APPARATUS HAVING THE SAME INCLUDING FIVE LENS UNITS OF +−++− OR +−−+− REFRACTIVE POWERS

(71) Applicant: CANON KABUSHIKI KAISHA, Tokyo (JP)

(72) Inventor: Shunji Iwamoto, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 18/148,737

(22) Filed: Dec. 30, 2022

(65) Prior Publication Data
US 2023/0213734 A1 Jul. 6, 2023

(30) Foreign Application Priority Data
Jan. 1, 2022 (JP) .................................. 2022-000014

(51) Int. Cl.
*G02B 15/14* (2006.01)
(52) U.S. Cl.
CPC ................ *G02B 15/145113* (2019.08); *G02B 15/145109* (2019.08)

(58) Field of Classification Search
CPC ................ G02B 15/145113; G02B 15/145109
See application file for complete search history.

(56) References Cited

U.S. PATENT DOCUMENTS

2014/0184887 A1* 7/2014 Yonetani ............ G02B 13/0015
359/557

FOREIGN PATENT DOCUMENTS

| JP | 2014142601 A | 8/2014 |
| JP | 2020060661 A | 4/2020 |

* cited by examiner

*Primary Examiner* — Wen Huang
(74) *Attorney, Agent, or Firm* — Canon U.S.A., Inc. IP Division

(57) ABSTRACT

An optical system includes, in order from an object side to an image side, a first lens unit having positive refractive power, a second lens unit having negative refractive power, a third lens unit having positive or negative refractive power, a fourth lens unit having positive refractive power, and a fifth lens unit having negative refractive power. During focusing from infinity to the shortest distance, the second lens unit and the fourth lens unit move, the first lens unit, the third lens unit, and the fifth lens unit do not move. A predetermined condition is satisfied.

17 Claims, 11 Drawing Sheets

OPTICAL SYSTEM AND IMAGE PICKUP APPARATUS HAVING THE SAME INCLUDING FIVE LENS UNITS OF +−++− OR +−−+− REFRACTIVE POWERS

BACKGROUND

Technical Field

One of the aspects of the disclosure relates to an optical system, which is suitable for a digital video camera, a digital still camera, a broadcasting camera, a film-based camera, a surveillance camera, an in-vehicle camera, and the like.

Description of the Related Art

There has recently been demanded an image pickup apparatus that has a long focal length, a large aperture ratio, a small size, and high optical performance, and can achieve high-speed autofocus (AF). In order to realize the high-speed AF with the small size and high optical performance, an inner focus optical system is known in which part of the lenses is moved during focusing (see Japanese Patent Laid-Open Nos. 2014-142601 and 2020-060661).

However, optical systems having the long focal length and large aperture ratio tend to have difficulty in correcting various aberrations. In particular, if the weight of the focus lens unit is reduced for faster AF, it becomes difficult to suppress aberration fluctuations during focusing from infinity to the shortest distance.

SUMMARY

The disclosure provides an optical system that has a long focal length, a large aperture ratio, a small size, and high optical performance, and can realize high-speed autofocus, and an image pickup apparatus having the same.

An optical system according to one aspect of the disclosure includes, in order from an object side to an image side, a first lens unit having positive refractive power, a second lens unit having negative refractive power, a third lens unit having positive or negative refractive power, a fourth lens unit having positive refractive power, and a fifth lens unit having negative refractive power. During focusing from infinity to the shortest distance, the second lens unit and the fourth lens unit move, the first lens unit, the third lens unit, and the fifth lens unit do not move. The following inequalities are satisfied:

$$0.10 < sk/f < 0.25$$

$$0.010 < f/|f3| < 0.500$$

$$-3.50 < f/f5 < -0.80$$

$$-1.6 < f/f2 < -0.3$$

where sk is a distance on an optical axis from a lens surface closest to an image plane of the optical system to the image plane, f is a focal length of the optical system in an in-focus state at infinity, and f3 is a focal length of the third lens unit, f5 is a focal length of the fifth lens unit, and f2 is a focal length of the second lens unit. An image pickup apparatus according to another aspect of the disclosure includes the above optical system.

Further features of the disclosure will become apparent from the following description of exemplary embodiments with reference to the attached drawings.

DESCRIPTION OF THE EMBODIMENTS

Figure 1:
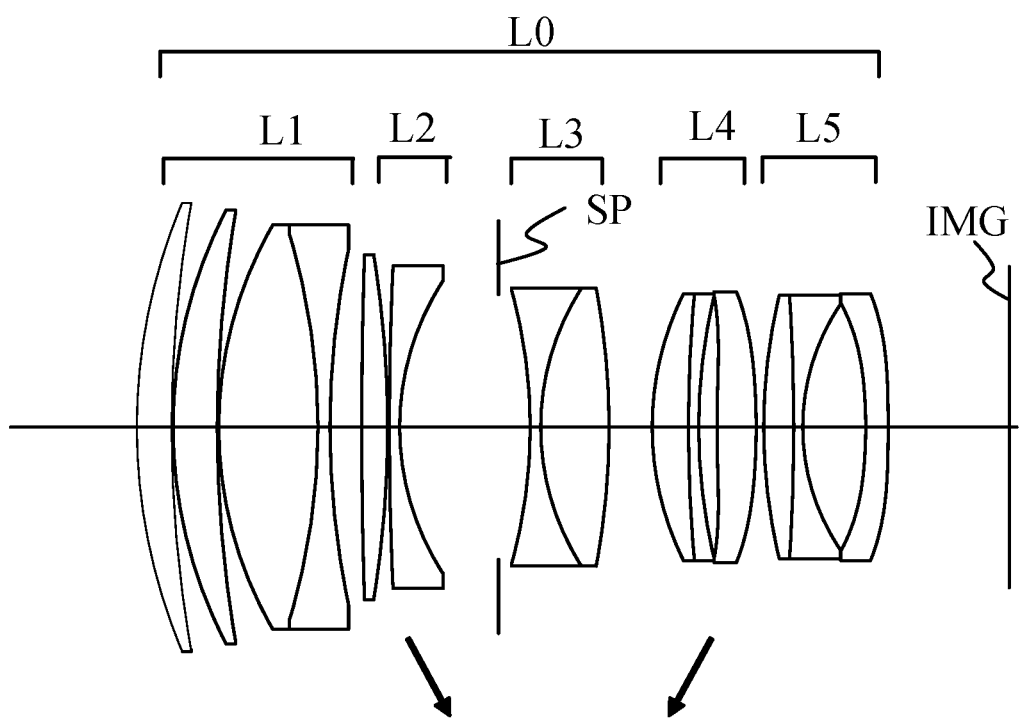
FIG. 1 is a sectional view of an optical system according to Example 1 in an in-focus state at infinity (on an infinity object).
Figure 2A:
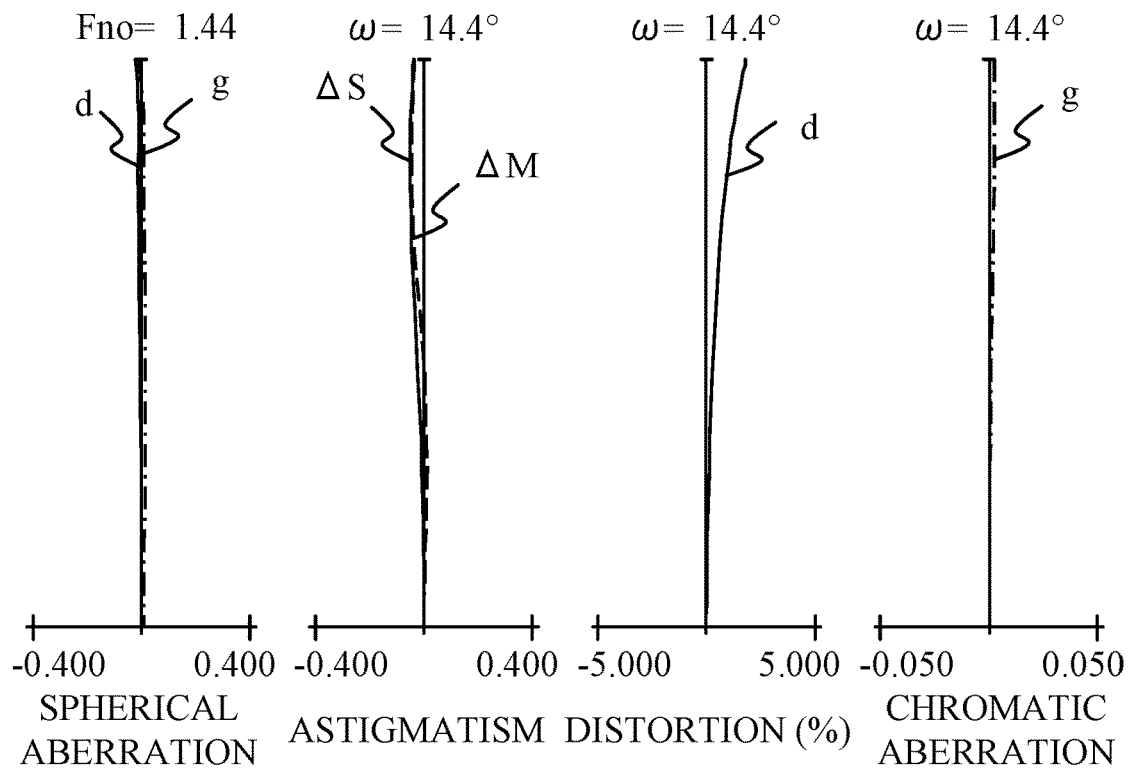
FIGS. 2A and 2B are longitudinal aberration diagrams of the optical system according to Example 1 in the in-focus state at infinity and an in-focus state at a short distance (on a short-distance object) (−700 mm).
Figure 2B:
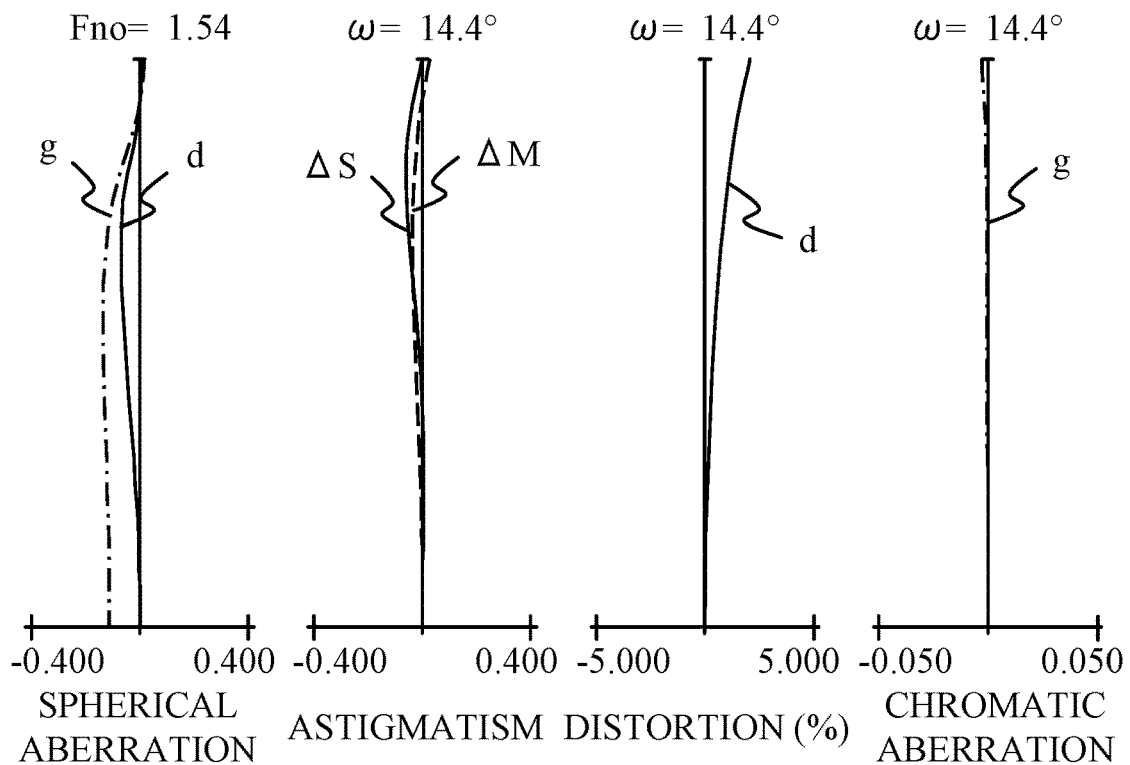
Figure 3:
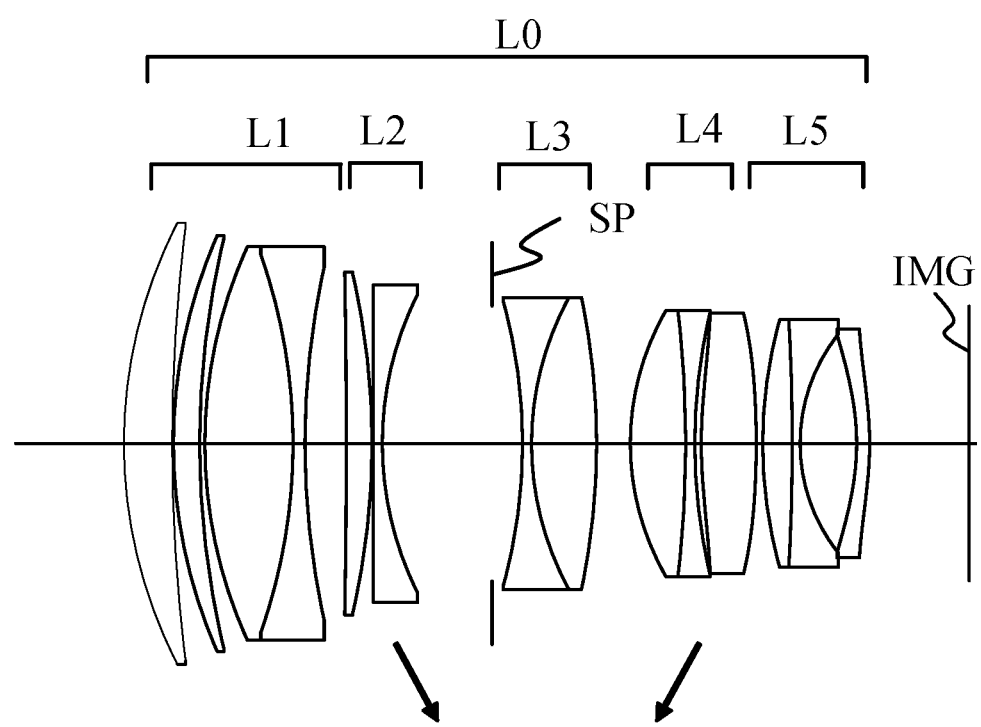
FIG. 3 is a sectional view of an optical system according to Example 2 in an in-focus state at infinity.
Figure 4A:
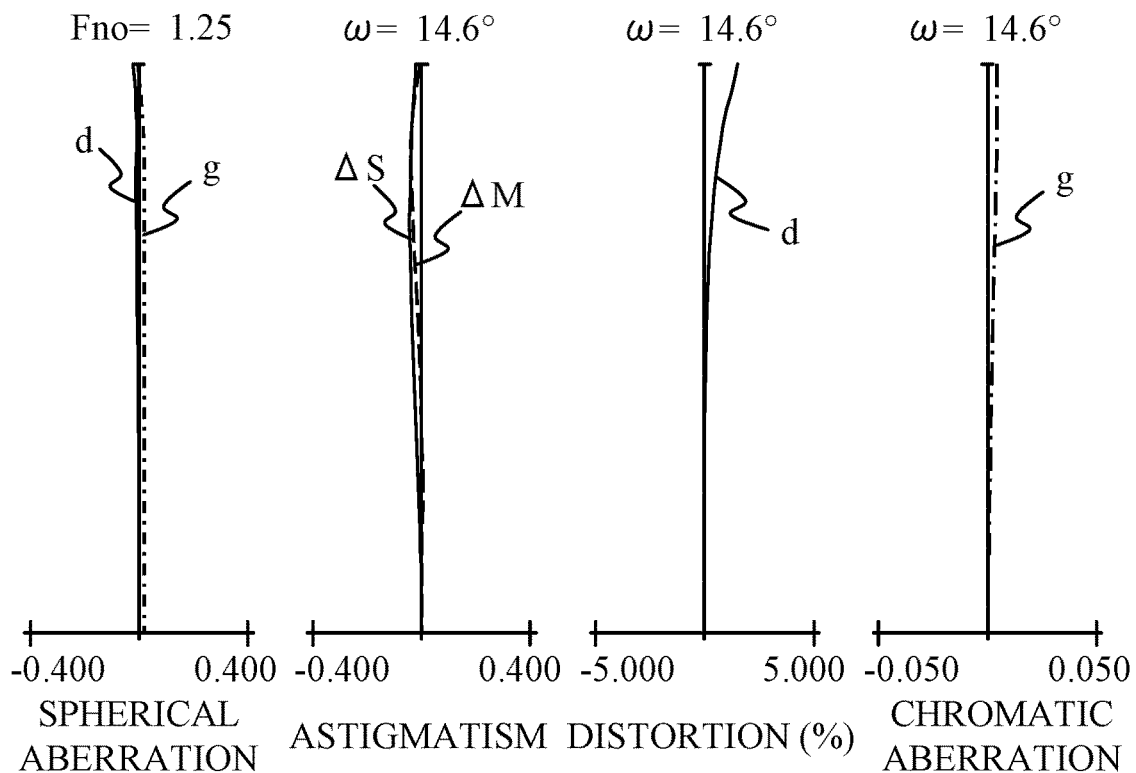
FIGS. 4A and 4B are longitudinal aberration diagrams of the optical system according to Example 2 in the in-focus state at infinity and an in-focus state at a short distance (−700 mm).
Figure 4B:
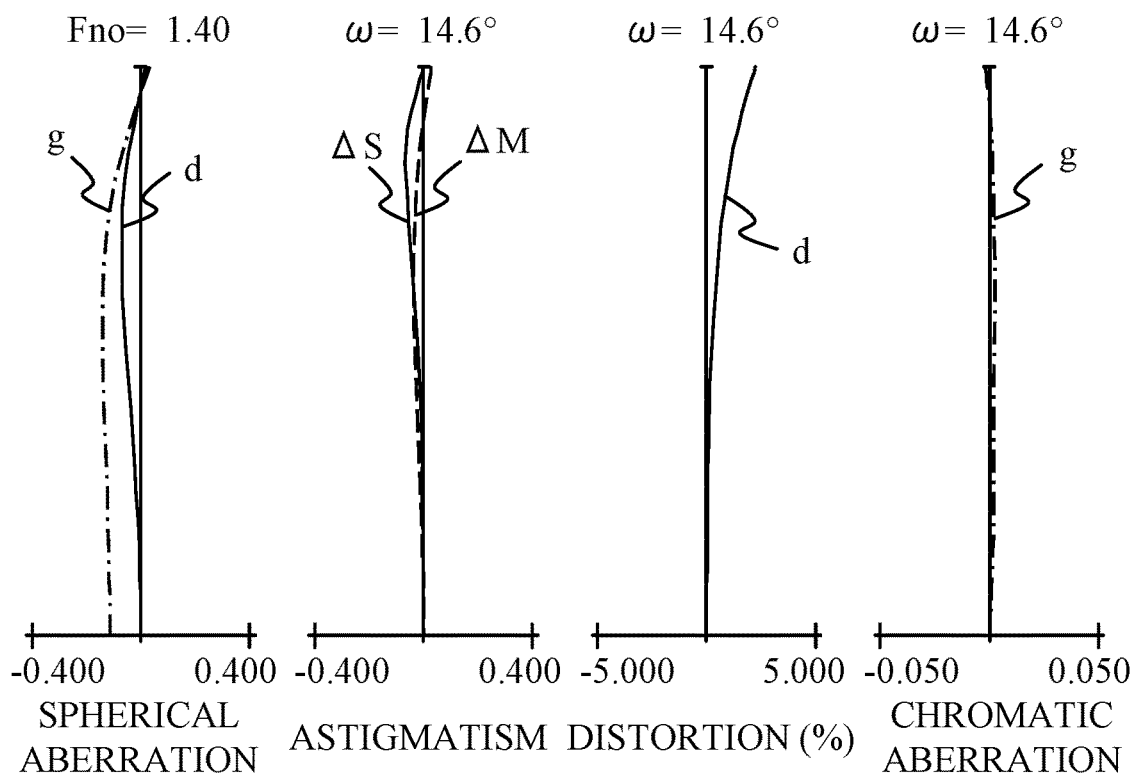
Figure 5:
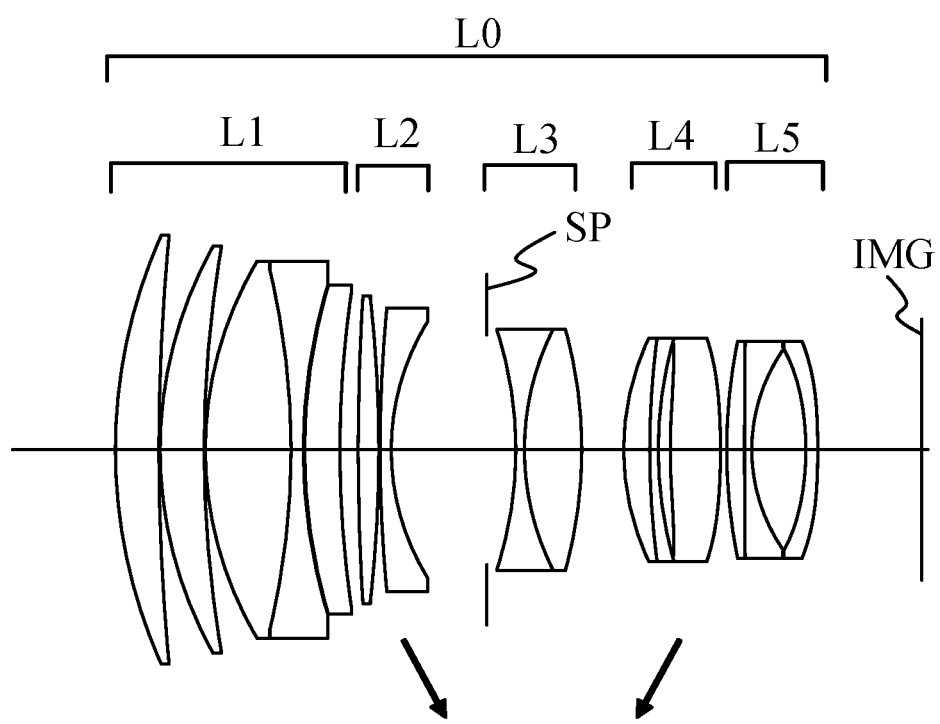
FIG. 5 is a sectional view of an optical system according to Example 3 in an in-focus state at infinity.
Figure 6A:
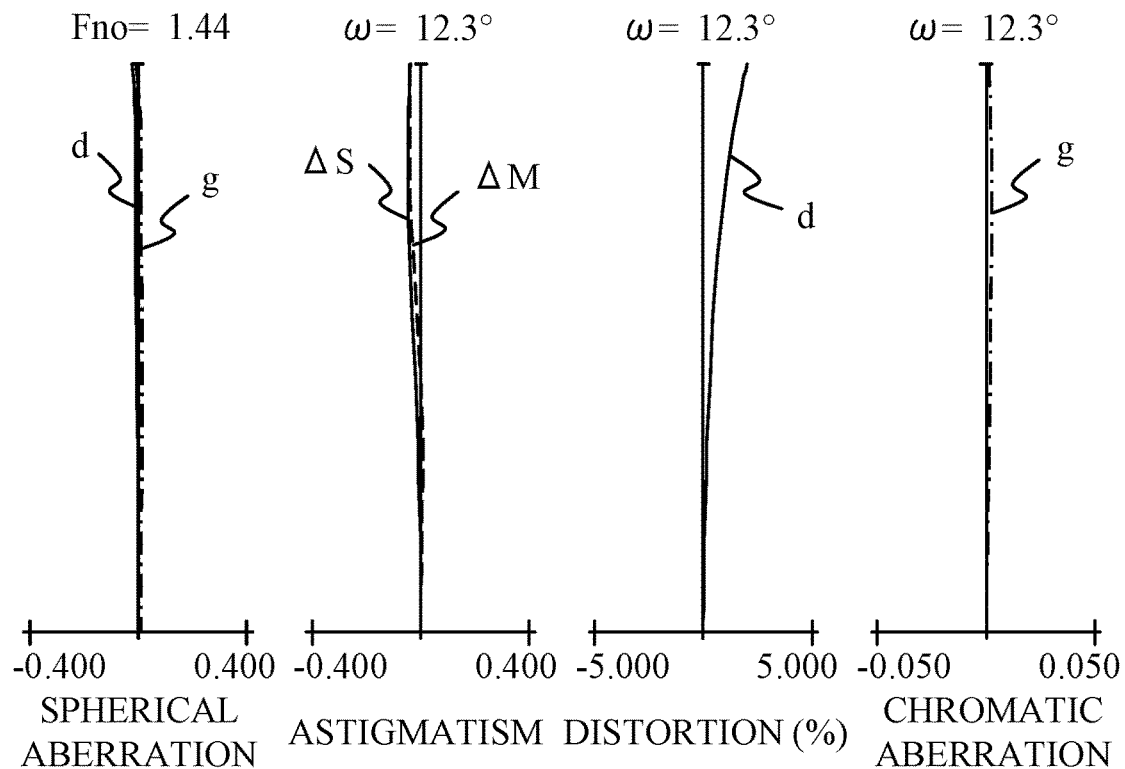
FIGS. 6A and 6B are longitudinal aberration diagrams of the optical system according to Example 3 in the in-focus state at infinity and an in-focus state at a short distance (−700 mm).
Figure 6B:
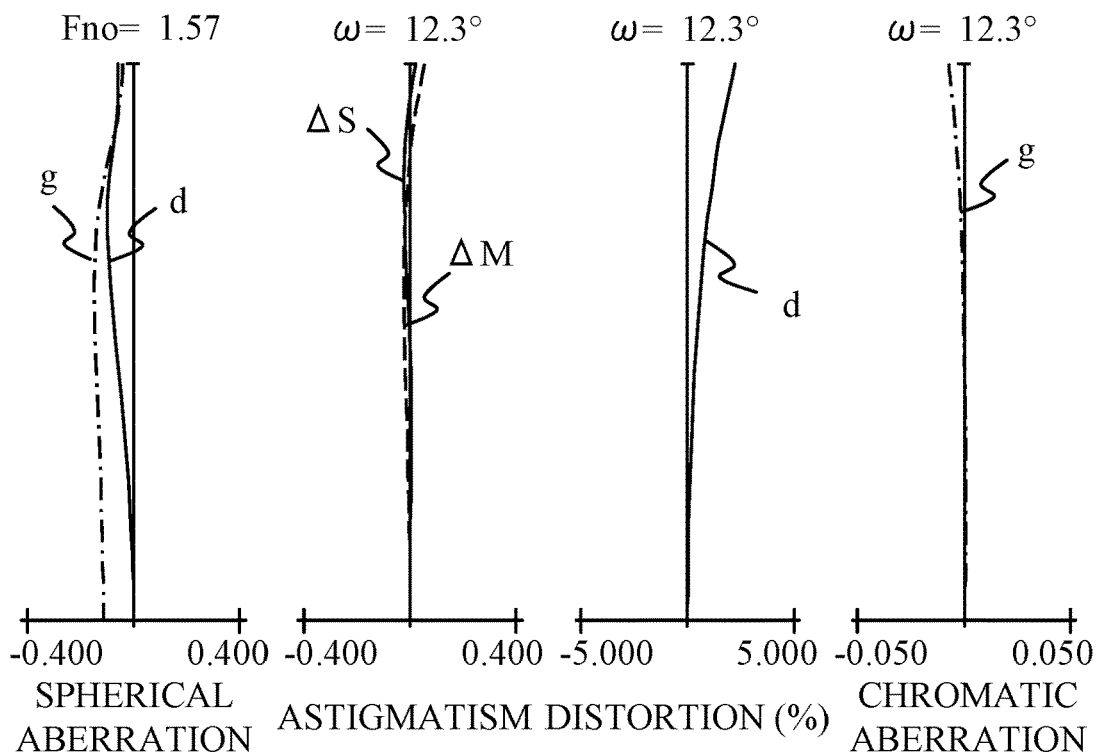
Figure 7:
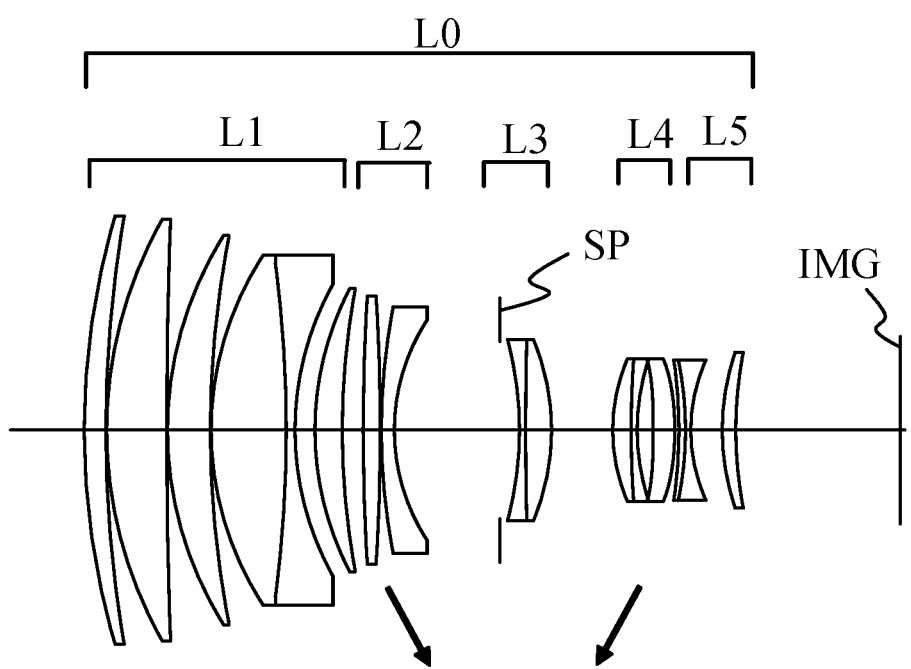
FIG. 7 is a sectional view of an optical system according to Example 4 in an in-focus state at infinity.
Figure 8A:
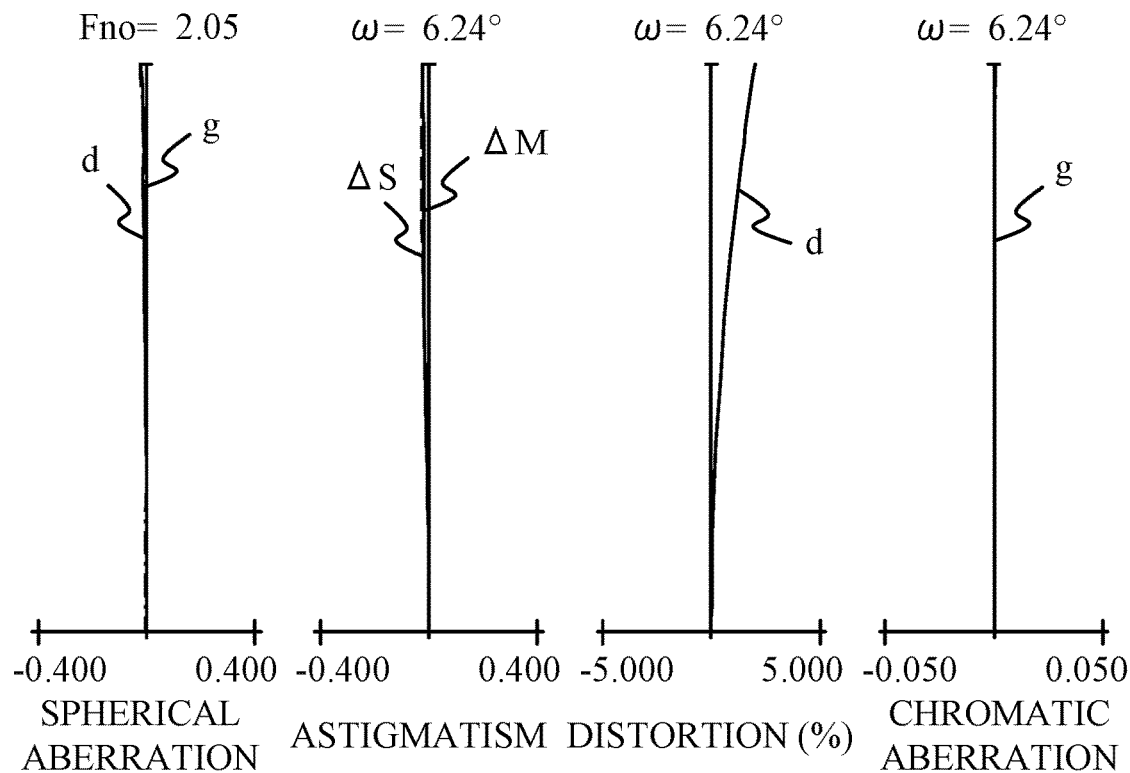
FIGS. 8A and 8B are longitudinal aberration diagrams of the optical system according to Example 4 in the in-focus state at infinity and an in-focus state at a short distance (−1200 mm).
Figure 8B:
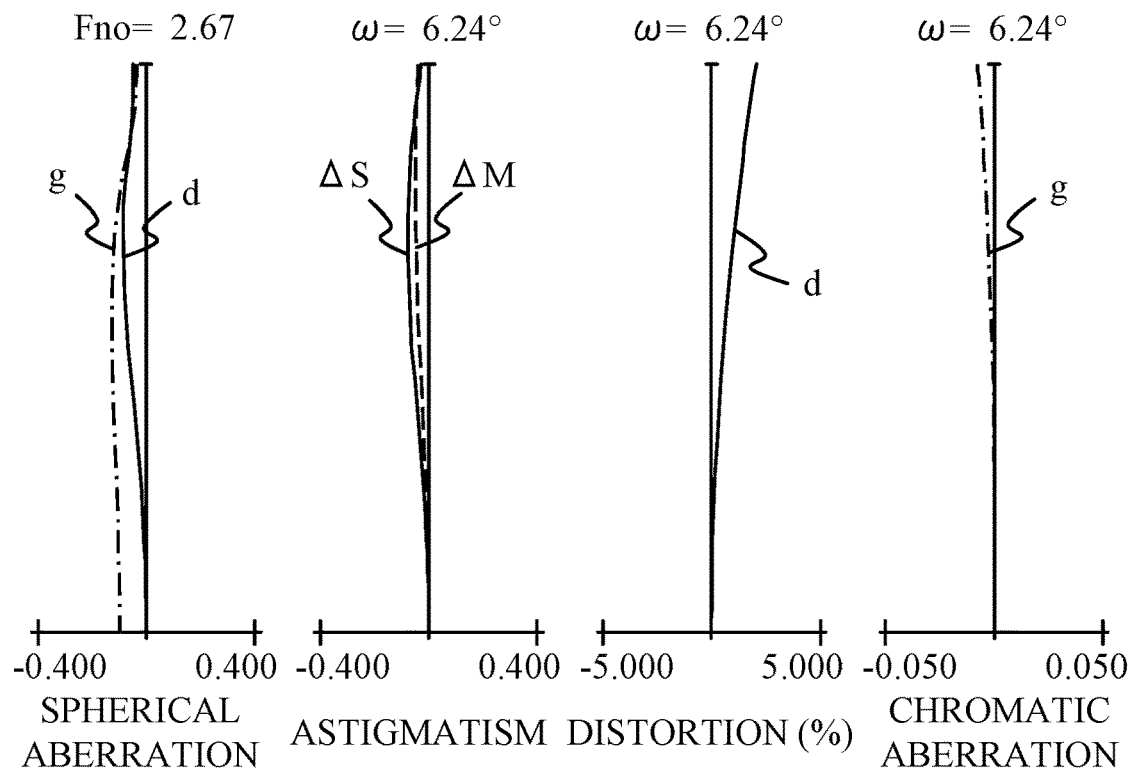
Figure 9:
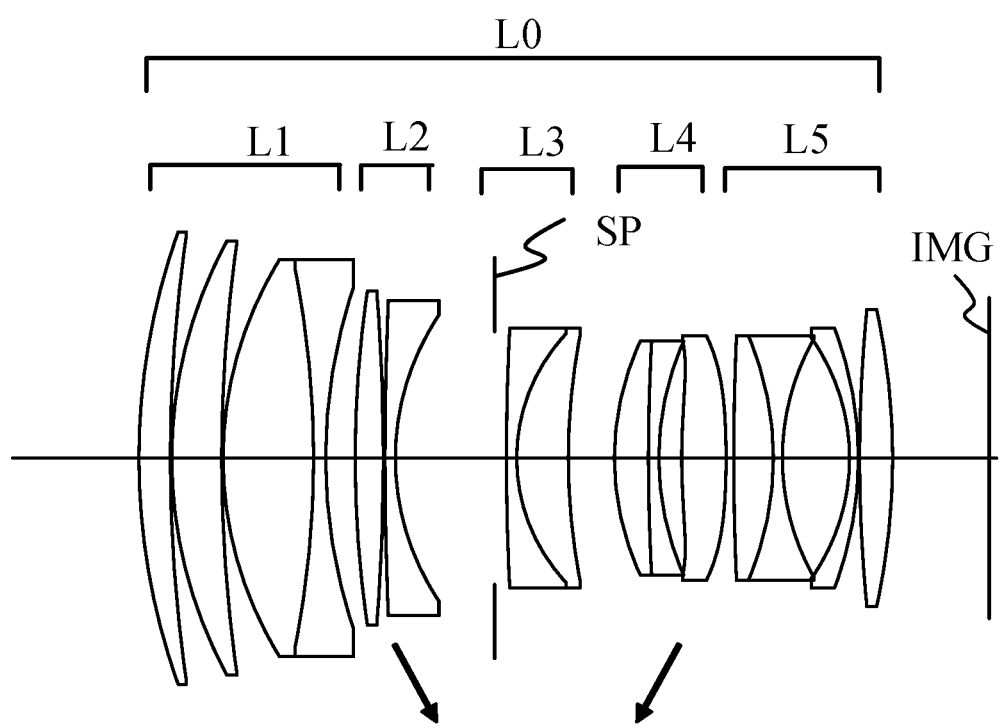
FIG. 9 is a sectional view of an optical system according to Example 5 in an in-focus state at infinity.
Figure 10A:
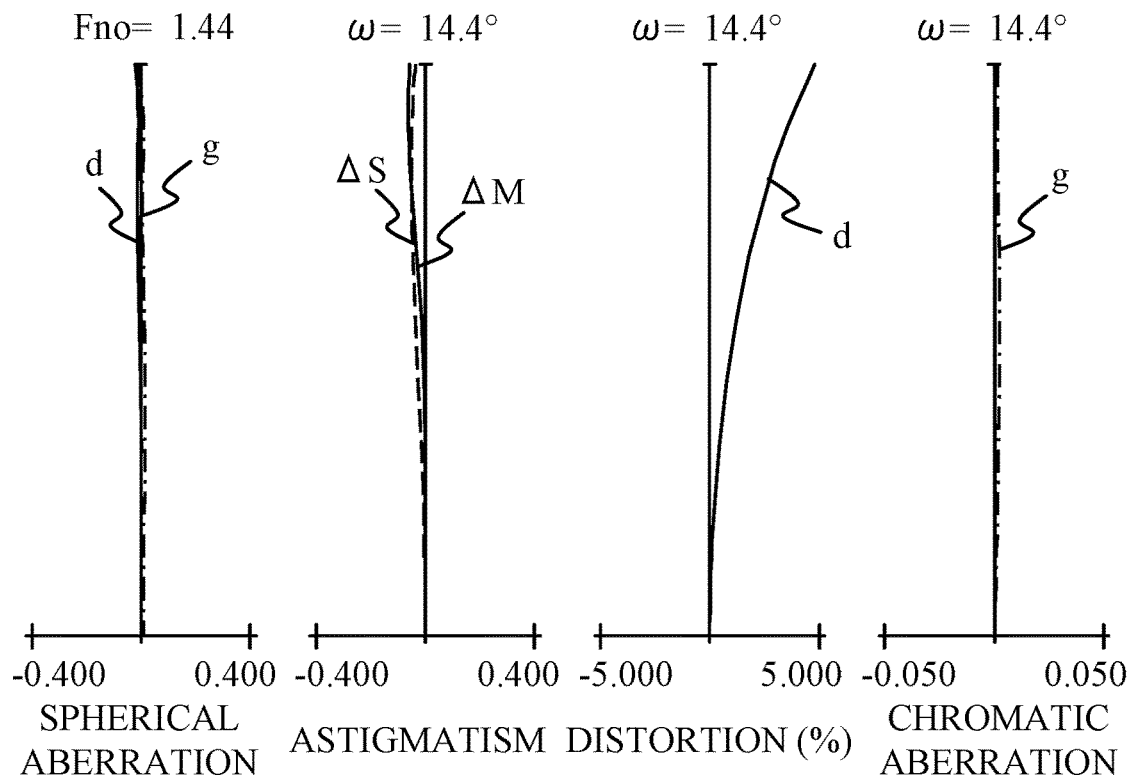
FIGS. 10A and 10B are longitudinal aberration diagrams of the optical system according to Example 5 in the in-focus state at infinity and an in-focus state at a short distance (−700 mm).
Figure 10B:
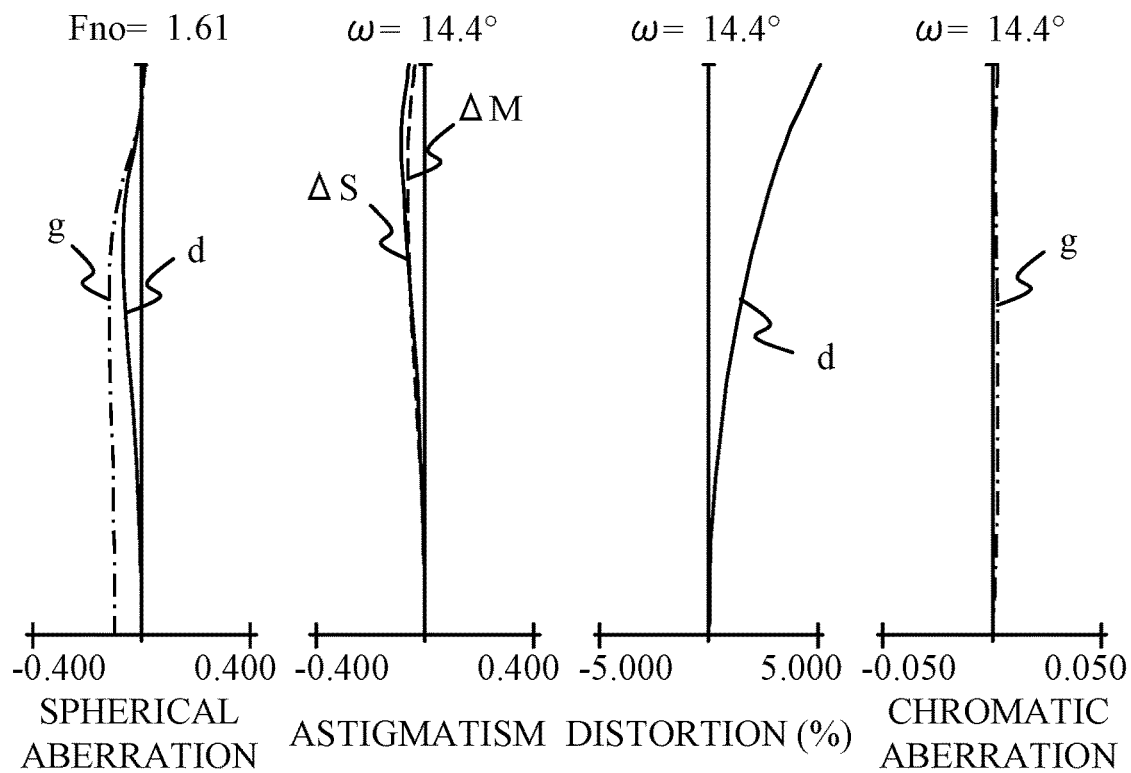

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5, 7, and 9 are sectional views of optical systems L0 according to Examples 1 to 5, respectively, in an in-focus state at infinity. The optical system L0 according to each example is an optical system for an image pickup apparatus such as a digital video camera, a digital still camera, a broadcasting camera, a film-based camera, a surveillance camera, and an in-vehicle camera.

In each sectional view, a left side is an object side and a right side is an image side. The optical system L0 according to each example includes a plurality of lens units. In the specification of this application, a lens unit is a group of lenses that are integrally moved or fixed during focusing. That is, in the optical system L0 according to each example, a distance between adjacent lens units changes during focusing. The lens unit includes one or more lenses.

The optical system L0 according to each example includes, in order from the object side to the image side, a first lens unit L1 having positive refractive power, a second lens unit L2 having negative refractive power, a third lens unit L3 having positive or negative refractive power, a fourth lens unit L4 having positive refractive power, and a fifth lens unit L5 having negative refractive power.

SP denotes an aperture stop (diaphragm). IMG is an image plane. In a case where the optical system L0 according to each example is used as an imaging optical system for a digital still camera or a digital video camera, an imaging plane of a solid-state image sensor (photoelectric conversion element) such as a CCD sensor or a CMOS sensor is placed on the image plane IMG. In a case where the optical system L0 according to each example is used as an imaging optical system for a film-based camera, a photosensitive surface corresponding to the film plane is placed on the image plane IMG.

An arrow illustrated in each sectional view represents a moving direction of a lens unit during focusing from infinity to the shortest distance (or the closest end). In the optical system L0 according to each example, during focusing from infinity to the shortest distance, the second lens unit L2 and the fourth lens unit L4 move, and the first lens unit L1, the third lens unit L3, and the fifth lens unit L5 do not move.

FIGS. 2A, 2B, 4A, 4B, 6A, 6B, 8A, 8B, 10A, and 10B are aberration diagrams of the optical systems L0 according to Examples 1 to 5, respectively. In each aberration diagram, FIGS. 2A, 4A, 6A, 8A, and 10A are longitudinal aberration diagrams of the optical systems L0 according to Examples 1 to 5, respectively, in an in-focus state at infinity, and FIGS. 2B, 4B, 6B, 8B, and 10B are longitudinal aberration diagrams of the optical systems L0 according to Examples 1 to 5, respectively, in an in-focus state at a short distance.

In a spherical aberration diagram, Fno denotes an F-number, which indicates spherical aberration amounts for the d-line (wavelength 587.6 nm) and the g-line (wavelength 435.8 nm). In an astigmatism diagram, ΔS denotes an astigmatism amount on a sagittal image plane, and ΔM denotes an astigmatism amount on a meridional image plane. A distortion diagram illustrates a distortion amount for the d-line. A chromatic aberration diagram illustrates a chromatic aberration amount for the g-line. ω is an imaging half angle of view (degrees).

A description will now be given of a characteristic configuration of the optical system L0 according to each example.

In order to achieve high optical performance, a long focal length, and a large aperture ratio with a small size and to achieve high-speed AF, the arrangement of the lens units included in the optical system L0 and the configuration and arrangement of the focus lens unit that moves during focusing are important. The optical system L0 according to each example includes a plurality of lens units and has a configuration in which part of the lens units are moved during focusing, thereby realizing aberration correction and weight reduction of the focus lens unit. The first lens unit L1 having positive refractive power disposed closest to the object can reduce a diameter of an on-axis light beam (luminous flux) incident on the second lens unit L2 and the fourth lens unit L4, which form the focus lens unit, and easily reduce the size and weight of the focus lens unit. The third lens unit L3 disposed between the second lens unit L2 and the fourth lens unit L4, which form the focus lens unit, can easily correct spherical aberration and longitudinal chromatic aberration. The fifth lens unit L5 having negative refractive power disposed on the image side of the second lens unit L2 and the fourth lens unit L4, which form the focus lens unit, can easily reduce the overall length of the optical system L0 and suppress the Petzval sum.

The optical system L0 according to each example satisfies the following inequality (1) to (4):

$$0.10 < sk/f < 0.25 \tag{1}$$

$$0.010 < f/|f3| < 0.500 \tag{2}$$

$$-3.50 < f/f5 < -0.80 \tag{3}$$

$$-1.6 < f/f2 < -0.3 \tag{4}$$

where sk is a distance on the optical axis from a lens surface closest to the image plane of the optical system L0 to the image plane (referred to as back focus hereinafter). f is a focal length of the optical system L0 in the in-focus state at infinity. f3 is a focal length of the third lens unit L3. f5 is a focal length of the fifth lens unit L5. f2 is a focal length of the second lens unit L2.

Inequality (1) defines a ratio between the back focus and the focal length of the optical system L0. In a case where the back focal length becomes so short that the value is lower than the lower limit of inequality (1), the layout near the image sensor becomes difficult and the configuration becomes complicated. In a case where the back focus becomes so long that the value is higher than the upper limit of inequality (1), the optical system L0 becomes large.

Inequality (2) defines a ratio between the focal length of the third lens unit L3 and the focal length of the optical system L0. In a case where the refractive power of the third lens unit L3 becomes so small that the value is lower than the lower limit of inequality (2), it becomes difficult to reduce the diameter of the on-axis light beam incident on the fourth lens unit L4, and the fourth lens unit L4 becomes large. In a case where the refractive power of the third lens unit L3 becomes so large that the value is higher than the upper limit of inequality (2), correction of spherical aberration becomes difficult.

Inequality (3) defines a ratio between the focal length of the fifth lens unit L5 and the focal length of the optical system L0. In a case where the refractive power of the fifth lens unit L5 becomes so small that the value is lower than the lower limit of inequality (3), correction of distortion becomes difficult. In a case where the refractive power of the fifth lens unit L5 becomes so large that the value is higher than the upper limit of inequality (3), it becomes difficult to shorten the overall length of the optical system L0, and the optical system L0 becomes large.

Inequality (4) defines a ratio between the focal length of the second lens unit L2 and the focal length of the optical system L0. In a case where the refractive power of the second lens unit L2 becomes so small that the value is lower than the lower limit of inequality (4), it becomes difficult to correct the spherical aberration generated in the second lens unit L2, and in particular, it becomes difficult to suppress the fluctuation of the spherical aberration during focusing. In a case where the refractive power of the second lens unit L2 becomes so large that the value is higher than the upper limit of inequality (4), the moving amount of the second lens unit L2 increases during focusing and the optical system L0 becomes large.

Inequalities (1) to (4) may be replaced with inequalities (1a) to (4a) below.

$$0.12 < sk/f < 0.22 \tag{1a}$$

$$0.011 < f/|f3| < 0.450 \tag{2a}$$

$$-2.50 < f/f5 < -1.20 \tag{3a}$$

$$-1.6 < f/f2 < -0.5 \tag{4a}$$

Inequalities (1) to (4) may be replaced with inequalities (1b) to (4b) below.

$$0.15 < sk/f < 0.20 \tag{1b}$$

$$0.012 < f/|f3| < 0.420 \tag{2b}$$

$$-2.40 < f/f5 < -1.50 \tag{3b}$$

$$-1.6 < f/f2 < -0.6 \tag{4b}$$

A description will now be given of configurations that may be satisfied by the optical system L0 according to each example.

The second lens unit L2 may include, in order from the object side to the image side, a positive lens L21 and a negative lens L22. In the second lens unit L2, the positive lens L21 disposed on the object side can suppress the lens diameter of the succeeding negative lens L22, and is advantageous to miniaturization. The second lens unit L2 may include two lenses, that is, the positive lens L21 and the negative lens L22, so that the weight can be easily reduced.

A biconcave air lens may be formed between the positive lens L21 and the negative lens L22. This configuration can easily suppress fluctuations in spherical aberration occurring in the second lens unit L2, and easily achieve high image quality over the entire focus range.

The fourth lens unit L4 may include, in order from the object side to the image side, a positive lens L41, a negative lens L42, and a positive lens L43, and the positive lens L41 and the negative lens L42 may be formed as a cemented lens. The cemented lens facilitates correction of longitudinal chromatic aberration. The fourth lens unit L4 including two positive lenses can disperse the refractive power, thereby facilitating correction of aberrations over the entire focal range.

The third lens unit L3 may include, in order from the object side to the image side, a negative lens L31 and a positive lens L32, and the negative lens L31 and the positive lens L32 may be formed as a cemented lens. The cemented lens facilitates suppression of the Petzval sum and correction of longitudinal chromatic aberration.

The third lens unit L3 may include the aperture stop SP. The third lens unit L3 including the aperture stop SP improves the symmetry of the refractive power arrangement before and after the aperture stop SP and facilitates corrections of distortion and coma.

The positive lens L11 may be disposed closest to the object side. This configuration facilitates reducing the overall length of the optical system L0 and the size and weight of the focus lens unit.

The first lens unit L1 may include two or more positive lenses and one or more negative lenses. This configuration facilitates shortening the overall length of the optical system L0 and suppressing longitudinal and lateral chromatic aberrations.

The fifth lens unit L5 may include a positive lens and a negative lens. Since the fifth lens unit L5 is the lens unit closest to the image plane, it is effective in correcting the Petzval sum, and since the fifth lens unit L5 includes a positive lens and a negative lens, curvature of field can be easily corrected.

A description will now be given of conditions that the optical system according to each example may satisfy. The optical system according to each example may satisfy one or more of the following inequalities (5) to (11).

$$0.4 < f/f1 < 2.5 \tag{5}$$

$$1.0 < f/f4 < 3.5 \tag{6}$$

$$0.7 < L/f < 2.0 \tag{7}$$

$$1.4 < b2 < 4.0 \tag{8}$$

$$0.1 < b4 < 0.8 \tag{9}$$

$$0.01 < M2/f < 0.30 \tag{10}$$

$$-0.20 < M4/f < -0.01 \tag{11}$$

Here, f1 is a focal length of the first lens unit L1. f4 is a focal length of the fourth lens unit L4. L is a distance on the optical axis from a lens surface closest to the object of the optical system L0 to the image plane (referred to as an overall optical length (overall lens length) hereinafter). b2 is an imaging lateral magnification of the second lens unit L2 in the in-focus state at infinity. b4 is an imaging lateral magnification of the fourth lens unit L4 in the in-focus state at infinity. M2 is a moving amount of the second lens unit L2 during focusing from infinity to the shortest distance, where a direction moving toward the image side is set positive. M4 is a moving amount of the fourth lens unit during focusing from infinity to the shortest distance, where a direction moving toward the image side is set positive.

Inequality (5) defines a ratio between the focal length of the first lens unit L1 and the focal length of the optical system L0. In a case where the refractive power of the first lens unit L1 becomes so small that the value is lower than the lower limit of inequality (5), it becomes difficult to shorten the overall length of the optical system L0, and the optical system L0 becomes large. In a case where the refractive power of the first lens unit L1 becomes so large that the value is higher than the upper limit of inequality (5), the aberrations generated in the first lens unit L1 increase, and it becomes difficult to correct spherical aberration and lateral chromatic aberration.

Inequality (6) defines a ratio between the focal length of the fourth lens unit L4 and the focal length of the optical system L0. In a case where the refractive power of the fourth lens unit L4 becomes so small that the value is lower than the lower limit of inequality (6), a moving amount of the fourth lens unit L4 during focusing becomes large and the optical system L0 becomes large. In a case where the refractive power of the second lens unit L2 becomes so large that the value is higher than the upper limit of inequality (6), it becomes difficult to correct spherical aberration generated in the fourth lens unit L4, and in particular, it becomes difficult to suppress the fluctuation of the spherical aberration during focusing.

Inequality (7) defines a ratio between the overall optical length and the focal length of the optical system L0. In a case where the overall optical length becomes so small that the value is lower than the lower limit of inequality (7), it becomes difficult to correct aberrations, especially lateral chromatic aberration. In a case where the overall optical length becomes so large that the value is higher than the upper limit of inequality (7), the diameter of the front lens increases and the optical system L0 becomes large.

Inequality (8) defines the imaging lateral magnification of in the in-focus state at infinity of the second lens unit L2. In a case where the imaging lateral magnification of the second lens unit L2 becomes so small that the value is lower than the lower limit of inequality (8), the moving amount of the second lens unit L2 for focusing becomes large and the optical system L0 becomes large. In a case where the lateral imaging magnification of the second lens unit L2 becomes so large that the value is higher than the upper limit of inequality (8), the heights of light rays incident on the succeeding lens units increase and the optical system L0 becomes large.

Inequality (9) defines the imaging lateral magnification of the fourth lens unit L4 in the in-focus state at infinity. In a case where the imaging lateral magnification of the fourth lens unit L4 becomes so small that the value is lower than the lower limit of inequality (9), the incident angle of the on-axis light beam on the fifth lens unit L5 increases, and it becomes difficult to correct spherical aberration and coma. In a case where the imaging lateral magnification of the fourth lens unit L4 becomes so large that the value is higher than the upper limit of inequality (9), the moving amount of the fourth lens unit L4 or focusing increases, and the optical system L0 becomes large.

Inequality (10) defines a ratio between the moving amount of the second lens unit L2 and the focal length of the optical system L0 during focusing from infinity to the shortest distance. In a case where the moving amount of the second lens unit L2 becomes so small that the value is lower than the lower limit of inequality (10), imaging in a range including the shortest distance becomes difficult. In a case where the moving amount of the second lens unit L2 becomes so large that the value is higher than the upper limit of inequality (10), the optical system L0 becomes large.

Inequality (11) defines a ratio between the moving amount of the fourth lens unit L4 and the focal length of the optical system L0 during focusing from infinity to the shortest distance. In a case where the moving amount of the fourth lens unit L4 becomes so small that the value is lower than the lower limit of inequality (11), that is, in a case where the absolute value of the moving amount of the fourth lens unit L4 becomes large, the optical system L0 becomes large. In a case where the moving amount of the fourth lens unit L4 becomes so large that the value is higher than the upper limit of inequality (11), that is, in a case where the absolute value of the moving amount of the fourth lens unit L4 becomes small, imaging in a range including the shortest distance becomes difficult.

Inequalities (5) to (11) may be replaced with inequalities (5a) to (11a) below.

$$0.5 < f/f1 < 2.0 \quad (5a)$$

$$1.5 < f/f4 < 3.0 \quad (6a)$$

$$0.8 < L/f < 1.8 \quad (7a)$$

$$1.6 < b2 < 3.3 \quad (8a)$$

$$0.2 < b4 < 0.7 \quad (9a)$$

$$0.02 < M2/f < 0.15 \quad (10a)$$

$$-0.10 < M4/f < -0.03 \quad (11a)$$

Inequalities (5) to (11) may be replaced with inequalities (5b) to (11b) below.

$$0.6 < f/f1 < 1.7 \quad (5b)$$

$$1.7 < f/f4 < 2.4 \quad (6b)$$

$$0.9 < L/f < 1.7 \quad (7b)$$

$$1.7 < b2 < 3.0 \quad (8b)$$

$$0.25 < b4 < 0.6 \quad (9b)$$

$$0.03 < M2/f < 0.13 \quad (10b)$$

$$-0.08 < M4/f < -0.05 \quad (11b)$$

A detailed description will be given of the optical system L0 according to each example.

Each of the optical systems L0 according to Examples 1 to 4 includes, in order from the object side to the image side, a first lens unit L1 having positive refractive power, a second lens unit L2 having negative refractive power, a third lens unit L3 having positive refractive power, a fourth lens unit L4 having positive refractive power, and a fifth lens unit L5 having negative refractive power.

The optical system L0 according to Example 5 includes, in order from the object side to the image side, a first lens unit L1 having positive refractive power, a second lens unit L2 having negative refractive power, a third lens unit L3 having negative refractive power, a fourth lens unit L4 having positive refractive power, and a fifth lens unit L5 having negative refractive power.

In the optical system L0 according to each example, during focusing from infinity to the shortest distance, the second lens unit L2 and the fourth lens unit L4 move, and the first lens unit L1, the third lens unit L3, and the fifth lens unit L5 do not move.

In the optical systems L0 according to Examples 1, 2, and 5, the first lens unit L1 includes, in order from the object side to the image side, a positive lens L11, a positive lens L12, a positive lens L13, and a negative lens L14. The positive lens L13 and the negative lens L14 are formed as a cemented lens.

In the optical system L0 according to Example 3, the first lens unit L1 includes, in order from the object side to the image side, a positive lens L11, a positive lens L12, a positive lens L13, a negative lens L14, and a positive lens L15. The positive lens L13 and the negative lens L14 are formed as a cemented lens.

In the optical system L0 according to Example 4, the first lens unit L1 includes, in order from the object side to the image side, a positive lens L11, a positive lens L12, a positive lens L13, a positive lens L14, a negative lens L15, and a positive lens L16. The positive lens L14 and the negative lens L15 are formed as a cemented lens.

In the optical system L0 according to each example, the second lens unit L2 includes, in order from the object side to the image side, a positive lens L21 and a negative lens L22.

In the optical system L0 according to each example, the third lens unit L3 includes, in order from the object side to the image side, a negative lens L31 and a positive lens L32. The negative lens L31 and the positive lens L32 are formed as a cemented lens.

In the optical system L0 according to each example, the third lens unit L3 includes an aperture stop SP.

In the optical system L0 according to each example, the fourth lens unit L4 includes, in order from the object side to the image side, a positive lens L41, a negative lens L42, and a positive lens L43. The positive lens L41 and the negative lens L42 are formed as a cemented lens.

In the optical systems L0 according to Examples 1 to 3, the fifth lens unit L5 includes, in order from the object side to the image side, a positive lens L51, a negative lens L52, and a negative lens L53. The positive lens L51 and the negative lens L52 are formed as a cemented lens.

In the optical system L0 according to Example 4, the fifth lens unit L5 includes, in order from the object side to the image side, a positive lens L51, a negative lens L52, and a positive lens L53. The positive lens L51 and the negative lens L52 are formed as a cemented lens.

In the optical system L0 according to Example 5, the fifth lens unit L5 includes, in order from the object side to the image side, a positive lens L51, a negative lens L52, a negative lens L53, and a positive lens L54. The positive lens L51 and the negative lens L52 are formed as a cemented lens.

Numerical examples 1 to 5 corresponding to Examples 1 to 5 will be illustrated below.

In surface data in each numerical example, r denotes a radius of curvature of each optical surface, and d (mm) denotes an on-axis distance (or a distance on the optical axis) between an m-th surface and an (m+1)-th surface, where m is a surface number counted from the light incident side. nd denotes a refractive index for the d-line of each optical element, and vd denotes an Abbe number of the optical element. The Abbe number vd of a certain material is expressed as follows:

$$vd=(Nd-1)/(NF-NC)$$

where Nd, NF, and NC are refractive indexes with respect to the d-line (587.6 nm), the F-line (486.1 nm), and the C-line (656.3 nm) in the Fraunhofer line, respectively.

A location where the on-axis distance d is variable illustrates the in-focus state at infinity and the in-focus state at a short distance. A numerical value of an object distance in the in-focus state at the short distance is given in parenthesis. The object distance is a distance from the image plane to the object position.

In each numerical example, each of d, focal length (mm), F-number, and half angle of view (degrees) has a value in a case where the optical system L0 according to each example is in the in-focus state on an object at infinity (infinity object). A "back focus" is a distance on the optical axis from the final lens surface (the lens surface closest to the image plane) to a paraxial image plane in terms of air equivalent length. An "overall lens length" is a length obtained by adding the back focus to a distance on the optical axis from the frontmost surface (lens surface closest to the object) to the final surface of the zoom lens.

In a case where the optical surface is aspherical, an asterisk * is attached to the right side of the surface number. The aspherical shape is expressed as follows:

$$X=(h^2/R)/[1+\{1-(1+K)(h/R)^2\}^{1/2}]+A4\times h^4+A6\times h^6+A8\times h^8+A10\times h^{10}+A12\times h^{12}$$

where X is a displacement amount from a surface vertex in the optical axis direction, h is a height from the optical axis in a direction orthogonal to the optical axis, R is a paraxial radius of curvature, K is a conical constant, A4, A6, A8, A10, and A12 are aspherical coefficients of respective orders. "e±XX" in each aspherical coefficient means "×10$^{\pm XX}$."

Numerical Example 1

| UNIT: mm Surface Data | | | | |
|---|---|---|---|---|
| Surface No. | r | d | nd | vd |
| 1 | 77.785 | 4.68 | 1.76385 | 48.5 |
| 2 | 172.845 | 0.20 | | |
| 3 | 63.371 | 5.95 | 1.49700 | 81.5 |
| 4 | 170.333 | 0.20 | | |
| 5 | 54.700 | 13.38 | 1.49700 | 81.5 |
| 6 | −89.309 | 1.60 | 1.83400 | 37.2 |
| 7 | 115.572 | (Variable) | | |
| 8 | 686.201 | 3.52 | 1.94594 | 18.0 |
| 9 | −143.362 | 0.20 | | |
| 10 | 457.173 | 1.40 | 1.67300 | 38.3 |
| 11 | 36.221 | (Variable) | | |
| 12(SP) | ∞ | 4.29 | | |
| 13 | −68.576 | 1.40 | 1.72825 | 28.5 |
| 14 | 34.701 | 9.22 | 1.87070 | 40.7 |
| 15 | −101.270 | (Variable) | | |
| 16 | 40.392 | 4.86 | 1.72916 | 54.7 |
| 17 | 192.612 | 1.40 | 1.67270 | 32.1 |
| 18 | 76.112 | 2.50 | | |
| 19* | 206.498 | 5.26 | 1.85135 | 40.1 |
| 20* | −91.873 | (Variable) | | |
| 21 | 75.769 | 4.06 | 1.92286 | 20.9 |
| 22 | −274.316 | 1.20 | 1.77047 | 29.7 |
| 23 | 29.541 | 8.48 | | |
| 24* | −73.133 | 3.03 | 1.58313 | 59.4 |
| 25* | −253.666 | 16.31 | | |
| Image Plane | ∞ | | | |

Aspheric Data

19th Surface

K = 0.00000e+00 A 4 = −9.07618e−06 A 6 = −6.11165e−09 A 8 = −1.04661e−11

20th Surface

K = 0.00000e+00 A 4 = −5.22186e−06 A 6 = −4.28155e−09 A 8 = −8.68689e−12

24th Surface

K = 0.00000e+00 A 4 = −2.25980e−05 A 6 = 2.43830e−08 A 8 = −3.13250e−11

25th Surface

K = 0.00000e+00 A 4 = −2.22797e−05 A 6 = 2.16423e−08 A 8 = −1.32136e−11

| | |
|---|---|
| Focal Length | 84.00 |
| FNO | 1.44 |
| Half Angle of View (°) | 14.44 |

-continued

| UNIT: mm | |
|---|---|
| Surface Data | |
| Image Height | 21.64 |
| Overall lens length | 117.50 |
| BF | 16.31 |

| | Infinity | Short Distance (−700 mm) |
|---|---|---|
| d 7 | 4.26 | 10.25 |
| d11 | 13.31 | 7.33 |
| d15 | 5.79 | 1.00 |
| d20 | 1.00 | 5.79 |
| d25 | 16.31 | 6.01 |

Lens Unit Data

| Lens Unit | Starting Surface | Focal Length |
|---|---|---|
| 1 | 1 | 93.82 |
| 2 | 8 | −111.97 |
| 3 | 12 | 405.35 |
| 4 | 16 | 46.82 |
| 5 | 21 | −54.20 |

Numerical Example 2

| UNIT: mm | | | | |
|---|---|---|---|---|
| Surface Data | | | | |
| Surface No. | r | d | nd | vd |
| 1 | 75.910 | 7.60 | 1.76385 | 48.5 |
| 2 | 278.185 | 0.20 | | |
| 3 | 81.251 | 4.11 | 1.59282 | 68.6 |
| 4 | 137.891 | 0.83 | | |
| 5 | 75.102 | 13.89 | 1.49700 | 81.5 |
| 6 | −89.633 | 1.86 | 1.89190 | 37.1 |
| 7 | 128.606 | (Variable) | | |
| 8 | −1506.651 | 4.06 | 1.94594 | 18.0 |
| 9 | −117.758 | 0.20 | | |
| 10 | −19994.632 | 1.40 | 1.80610 | 33.3 |
| 11 | 52.584 | (Variable) | | |
| 12(SP) | ∞ | 4.81 | | |
| 13 | −83.985 | 1.40 | 1.69895 | 30.1 |
| 14 | 47.790 | 10.25 | 1.87070 | 40.7 |
| 15 | −110.778 | (Variable) | | |
| 16 | 41.915 | 8.74 | 1.69680 | 55.5 |
| 17 | −173.265 | 1.40 | 1.69895 | 30.1 |
| 18 | 89.247 | 1.05 | | |
| 19* | 88.271 | 8.63 | 1.85135 | 40.1 |
| 20* | −134.588 | (Variable) | | |
| 21 | 71.964 | 4.69 | 1.92286 | 20.9 |
| 22 | −316.497 | 1.20 | 1.77047 | 29.7 |
| 23 | 27.700 | 8.93 | | |
| 24* | −37.015 | 2.00 | 1.88202 | 37.2 |
| 25* | −58.504 | 15.69 | | |
| Image Plane | ∞ | | | |

Aspheric Data

19th Surface

K = 0.00000e+00 A 4 = −4.61083e−06 A 6 = −2.59781e−09 A 8 = −1.59591e−12

20th Surface

K = 0.00000e+00 A 4 = −1.47775e−06 A 6 = −2.06115e−09 A 8 = −1.05938e−12

24th Surface

K = 0.00000e+00 A 4 = 1.57806e−05 A 6 = −2.19149e−08 A 8 = 4.05207e−11

25th Surface

K = 0.00000e+00 A 4 = 1.37873e−05 A 6 = −1.94341e−08 A 8 = 4.25441e−11

-continued

| UNIT: mm Surface Data | |
|---|---|
| Focal Length | 83.00 |
| FNO | 1.25 |
| Half Angle of View (°) | 14.61 |
| Image Height | 21.64 |
| Overall lens length | 133.01 |
| BF | 15.69 |

| | Infinity | Short Distance (−700 mm) |
|---|---|---|
| d 7 | 6.52 | 16.70 |
| d11 | 17.27 | 7.09 |
| d15 | 5.29 | 1.00 |
| d20 | 1.00 | 5.29 |
| d25 | 15.69 | 5.18 |

| Lens Unit Data | | |
|---|---|---|
| Lens Unit | Starting Surface | Focal Length |
| 1 | 1 | 125.21 |
| 2 | 8 | −127.16 |
| 3 | 12 | 293.03 |
| 4 | 16 | 43.02 |
| 5 | 21 | −45.00 |

Numerical Example 3

| UNIT: mm Surface Data | | | | |
|---|---|---|---|---|
| Surface No. | r | d | nd | vd |
| 1 | 86.709 | 7.20 | 1.61800 | 63.4 |
| 2 | 369.488 | 0.20 | | |
| 3 | 69.023 | 7.29 | 1.49700 | 81.5 |
| 4 | 197.730 | 0.20 | | |
| 5 | 61.193 | 14.21 | 1.49700 | 81.5 |
| 6 | −127.175 | 2.00 | 1.87070 | 40.7 |
| 7 | 93.340 | 0.21 | | |
| 8 | 95.976 | 5.85 | 1.49700 | 81.5 |
| 9 | 178.462 | (Variable) | | |
| 10 | 392.711 | 3.45 | 1.94594 | 18.0 |
| 11 | −223.486 | 0.20 | | |
| 12 | 247.577 | 1.85 | 1.83481 | 42.7 |
| 13 | 40.471 | (Variable) | | |
| 14(SP) | ∞ | 4.82 | | |
| 15 | −63.837 | 1.40 | 1.72825 | 28.5 |
| 16 | 44.300 | 9.51 | 1.87070 | 40.7 |
| 17 | −74.293 | (Variable) | | |
| 18 | 43.005 | 4.33 | 1.72916 | 54.7 |
| 19 | 141.112 | 1.40 | 1.69895 | 30.1 |
| 20 | 66.919 | 2.02 | | |
| 21* | 114.498 | 8.30 | 1.76450 | 49.1 |
| 22* | −112.430 | (Variable) | | |
| 23 | 89.498 | 2.96 | 1.92286 | 20.9 |
| 24 | 1396.785 | 1.20 | 1.67300 | 38.3 |
| 25 | 29.039 | 8.92 | | |
| 26* | −57.271 | 2.00 | 1.58313 | 59.4 |
| 27* | −140.719 | 17.24 | | |
| Image Plane | ∞ | | | |

Aspheric Data

21st Surface

K = 0.00000e+00 A 4 = −6.61737e−06 A 6 = −5.27557e−09 A 8 = −7.47702e−12

22nd Surface

K = 0.00000e+00 A 4 = −4.30497e−06 A 6 = −4.81815e−09 A 8 = −3.46829e−12

26th Surface

K = 0.00000e+00 A 4 = −1.91464e−05 A 6 = 2.29584e−08 A 8 = −2.64435e−11

-continued

| UNIT: mm Surface Data | |
|---|---|
| 27th Surface | |

K = 0.00000e+00 A 4 = −1.95897e−05 A 6 = 2.30203e−08 A 8 = −1.63145e−11

| | |
|---|---|
| Focal Length | 99.00 |
| FNO | 1.44 |
| Half Angle of View (°) | 12.33 |
| Image Height | 21.64 |
| Overall lens length | 133.50 |
| BF | 17.24 |

| | Infinity | Short Distance (−700 mm) |
|---|---|---|
| d 9 | 3.01 | 11.26 |
| d13 | 15.82 | 7.57 |
| d17 | 6.91 | 1.00 |
| d22 | 1.00 | 6.91 |
| d27 | 17.24 | 3.35 |

| Lens Unit Data | | |
|---|---|---|
| Lens Unit | Starting Surface | Focal Length |
| 1 | 1 | 95.26 |
| 2 | 10 | −96.82 |
| 3 | 14 | 240.85 |
| 4 | 18 | 52.62 |
| 5 | 23 | −52.76 |

Numerical Example 4

| UNIT: mm Surface Data | | | | |
|---|---|---|---|---|
| Surface No. | r | d | nd | vd |
| 1 | 174.540 | 5.00 | 1.59349 | 67.0 |
| 2 | 289.447 | 0.20 | | |
| 3 | 98.775 | 13.84 | 1.43387 | 95.1 |
| 4 | 1295.204 | 0.20 | | |
| 5 | 84.449 | 9.87 | 1.49700 | 81.5 |
| 6 | 232.436 | 0.20 | | |
| 7 | 73.986 | 17.37 | 1.49700 | 81.5 |
| 8 | −295.998 | 2.00 | 1.87070 | 40.7 |
| 9 | 69.370 | 4.61 | | |
| 10 | 70.644 | 6.30 | 1.49700 | 81.5 |
| 11 | 177.413 | (Variable) | | |
| 12 | 478.926 | 4.01 | 1.94594 | 18.0 |
| 13 | −478.755 | 0.20 | | |
| 14 | 148.546 | 3.00 | 1.80400 | 46.5 |
| 15 | 46.627 | (Variable) | | |
| 16(SP) | ∞ | 4.56 | | |
| 17 | −79.969 | 1.40 | 1.77250 | 49.6 |
| 18 | 800.000 | 6.02 | 1.51742 | 52.4 |
| 19 | −53.956 | (Variable) | | |
| 20 | 41.447 | 4.25 | 1.83400 | 37.2 |
| 21 | 225.784 | 1.40 | 1.84666 | 23.8 |
| 22 | 51.524 | 3.72 | | |
| 23* | −230.448 | 4.98 | 1.76450 | 49.1 |
| 24* | −69.264 | (Variable) | | |
| 25 | −106.542 | 1.49 | 1.84666 | 23.8 |
| 26 | −80.086 | 1.20 | 1.49700 | 81.5 |
| 27 | 39.190 | 7.26 | | |
| 28 | 55.080 | 3.12 | 1.58313 | 59.4 |
| 29* | 88.761 | 38.05 | | |
| Image Plane | ∞ | | | |

| Aspheric Data |
|---|
| 23rd Surface |

K = 0.00000e+00 A 4 = −9.23397e−06 A 6 = −6.40417e−09 A 8 = −9.52243e−12

-continued

UNIT: mm
Surface Data

24th Surface

K = 0.00000e+00 A 4 = −7.11589e−06 A 6 = −4.70098e−09 A 8 = −6.63629e−12

29th Surface

K = 0.00000e+00 A 4 = −6.74980e−07 A 6 = −3.45420e−10 A 8 = −7.82351e−13

| | |
|---|---|
| Focal Length | 198.00 |
| FNO | 2.05 |
| Half Angle of View (°) | 6.24 |
| Image Height | 21.64 |
| Overall lens length | 188.50 |
| BF | 38.05 |

| | Infinity | Short Distance (−700 mm) |
|---|---|---|
| d11 | 4.82 | 11.16 |
| d15 | 24.36 | 18.02 |
| d19 | 14.09 | 1.00 |
| d24 | 1.00 | 14.09 |
| d29 | 38.05 | 10.80 |

Lens Unit Data

| Lens Unit | Starting Surface | Focal Length |
|---|---|---|
| 1 | 1 | 119.40 |
| 2 | 12 | −132.23 |
| 3 | 16 | 16396.06 |
| 4 | 20 | 84.65 |
| 5 | 25 | −84.19 |

Numerical Example 5

UNIT: mm
Surface Data

| Surface No. | r | d | nd | vd |
|---|---|---|---|---|
| 1 | 90.525 | 4.22 | 1.76385 | 48.5 |
| 2 | 209.644 | 0.20 | | |
| 3 | 61.314 | 6.71 | 1.59522 | 67.7 |
| 4 | 204.455 | 0.20 | | |
| 5 | 50.907 | 12.20 | 1.49700 | 81.5 |
| 6 | −130.720 | 1.60 | 1.80610 | 33.3 |
| 7 | 72.226 | (Variable) | | |
| 8 | 155.728 | 3.81 | 1.94594 | 18.0 |
| 9 | −273.024 | 0.20 | | |
| 10 | 493.162 | 1.40 | 1.67300 | 38.3 |
| 11 | 34.600 | (Variable) | | |
| 12(SP) | ∞ | 1.57 | | |
| 13 | 323.382 | 1.40 | 1.73465 | 28.3 |
| 14 | 24.447 | 6.95 | 1.87070 | 40.7 |
| 15 | 86.688 | (Variable) | | |
| 16 | 37.184 | 4.58 | 1.90043 | 37.4 |
| 17 | 282.676 | 1.40 | 1.68167 | 31.4 |
| 18 | 38.658 | 3.09 | | |
| 19* | 86.149 | 6.00 | 1.85135 | 40.1 |
| 20* | −89.241 | (Variable) | | |
| 21 | 355.236 | 5.36 | 2.00069 | 25.5 |
| 22 | −41.762 | 1.20 | 1.77047 | 29.7 |
| 23 | 32.530 | 9.05 | | |
| 24 | −28.121 | 1.20 | 1.85478 | 24.8 |
| 25 | −48.897 | 0.15 | | |
| 26 | 207.303 | 4.46 | 2.00100 | 29.1 |
| 27 | −93.322 | 13.00 | | |
| Image Plane | ∞ | | | |

-continued

UNIT: mm
Surface Data

Aspheric Data

19th Surface

K = 0.00000e+00 A 4 = −1.35818e−05 A 6 = −1.76204e−08 A 8 = −5.55965e−11
20th Surface K = 0.00000e+00 A 4 = −9.59369e−06 A 6 = −1.32570e−08 A 8 = −3.11565e−11

| | |
|---|---|
| Focal Length | 84.00 |
| FNO | 1.44 |
| Half Angle of View (°) | 14.44 |
| Image Height | 21.64 |
| Overall lens length | 114.50 |
| BF | 13.00 |

| | Infinity | Short Distance (−700 mm) |
|---|---|---|
| d 7 | 3.99 | 10.11 |
| d11 | 13.37 | 7.24 |
| d15 | 6.20 | 1.00 |
| d20 | 1.00 | 6.20 |
| d27 | 13.00 | 2.09 |

Zoom Lens Unit Data

| Lens Unit | Starting Surface | Focal Length |
|---|---|---|
| 1 | 1 | 93.36 |
| 2 | 8 | −122.52 |
| 3 | 12 | −524.52 |
| 4 | 16 | 41.31 |
| 5 | 21 | −95.79 |

Table 1 below summarizes various values in each numerical example.

TABLE 1

| Inequality | Ex. 1 | Ex. 2 | Ex. 3 | Ex. 4 | Ex. 5 |
|---|---|---|---|---|---|
| (1) | 0.194 | 0.189 | 0.174 | 0.192 | 0.155 |
| (2) | 0.207 | 0.283 | 0.411 | 0.012 | 0.160 |
| (3) | −1.550 | −1.845 | −1.876 | −2.352 | −0.877 |
| (4) | −0.750 | −0.653 | −1.023 | −1.497 | −0.686 |
| (5) | 0.895 | 0.663 | 1.039 | 1.658 | 0.900 |
| (6) | 1.794 | 1.930 | 1.881 | 2.339 | 2.033 |
| (7) | 1.399 | 1.602 | 1.348 | 0.952 | 1.363 |
| (8) | 2.180 | 2.864 | 2.395 | 1.847 | 1.909 |
| (9) | 0.359 | 0.265 | 0.423 | 0.543 | 0.298 |
| (10) | 0.071 | 0.123 | 0.083 | 0.032 | 0.073 |
| (11) | −0.057 | −0.052 | −0.060 | −0.066 | −0.062 |

Image Pickup Apparatus

Figure 11:
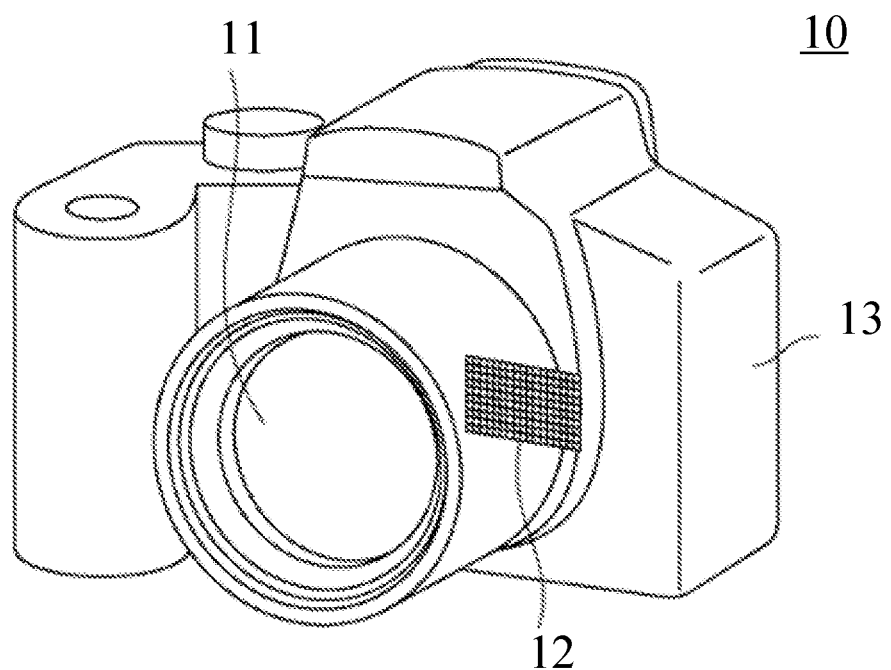
FIG. 11 is a schematic diagram of an image pickup apparatus.

Referring now to FIG. 11, a description will now be given of an example of a digital still camera (image pickup apparatus) using the optical system according to each example. In FIG. 11, reference numeral 10 denotes a camera body, and reference numeral 11 denotes one of the optical systems described in Examples 1 to 5. Reference numeral 12 denotes a solid-state image sensor (photoelectric conversion element) such as a CCD sensor or CMOS sensor, which is built in the camera body 10 and receives and photoelectrically converts an optical image formed by the optical system 11. The camera body 10 may be a so-called single-lens reflex camera having a quick turn mirror, or a so-called mirrorless camera without a quick turn mirror.

Applying the optical system according to each example to an image pickup apparatus such as a digital still camera can provide an image pickup apparatus having a small lens.

Each of the above examples can provide an optical system having a long focal length, a large aperture ratio, a small size, high optical performance, and high-speed AF, and an image pickup apparatus having the optical system.

While the disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-000014, filed on Jan. 1, 2022, which is hereby incorporated by reference herein in its entirety.

What is claimed is:

1. An optical system comprising, in order from an object side to an image side, a first lens unit having positive refractive power, a second lens unit having negative refractive power, a third lens unit having positive or negative refractive power, a fourth lens unit having positive refractive power, and a fifth lens unit having negative refractive power, wherein during focusing from infinity to the shortest distance, the second lens unit and the fourth lens unit move, the first lens unit, the third lens unit, and the fifth lens unit do not move, and wherein the following inequalities are satisfied:

$0.10 < sk/f < 0.25$ $0.010 < f/|f3| < 0.500$ $-3.50 < f/f5 < -0.80$ $-1.6 < f/f2 < -0.3$ where sk is a distance on an optical axis from a lens surface closest to an image plane of the optical system to the image plane, f is a focal length of the optical system in an in-focus state at infinity, and f3 is a focal length of the third lens unit, f5 is a focal length of the fifth lens unit, and f2 is a focal length of the second lens unit.

2. The optical system according to claim 1, wherein the following inequality is satisfied:

$$0.4 < f/f1 < 2.5$$

where f1 is a focal length of the first lens unit.

3. The optical system according to claim 1, wherein the following inequality is satisfied:

$$1.0 < f/f4 < 3.5$$

where f4 is a focal length of the fourth lens unit.

4. The optical system according to claim 1, wherein the following inequality is satisfied:

$$0.7 < L/f < 2.0$$

where L is a distance on the optical axis from a lens surface closest to an object of the optical system to the image plane.

5. The optical system according to claim 1, wherein the following inequality is satisfied:

$$1.4 < b2 < 4.0$$

where b2 is a lateral magnification of the second lens unit in the in-focus state at infinity.

6. The optical system according to claim 1, wherein the following inequality is satisfied:

$$0.1 < b4 < 0.8$$

where b4 is a lateral magnification of the fourth lens unit in the in-focus state at infinity.

7. The optical system according to claim 1, wherein the following inequality is satisfied:

$$0.01 < M2/f < 0.30$$

where a direction moving toward the image side is set positive and M2 is a moving amount of the second lens unit during focusing from infinity to the shortest distance.

8. The optical system according to claim 1, wherein the following inequality is satisfied:

$$-0.20 < M4/f < -0.01$$

where a direction moving toward the image side is set positive, and M4 is a moving amount of the fourth lens unit during focusing from infinity to the shortest distance.

9. The optical system according to claim 1, wherein the second lens unit includes, in order from the object side to the image side, a positive lens L21 and a negative lens L22.

10. The optical system according to claim 9, wherein a biconcave air lens is formed between the positive lens and the negative lens.

11. The optical system according to claim 1, wherein the fourth lens unit includes, in order from the object side to the image side, a positive lens L41, a negative lens L42, and a positive lens L43, and
wherein the positive lens L41 and the negative lens L42 are formed as a cemented lens.

12. The optical system according to claim 1, wherein the third lens unit includes, in order from the object side to the image side, a negative lens L31 and a positive lens L32, and
wherein the negative lens L31 and the positive lens L32 are formed as a cemented lens.

13. The optical system according to claim 1, wherein the third lens unit includes an aperture stop.

14. The optical system according to claim 1, wherein the first lens unit includes a positive lens L11 disposed closest to an object.

15. The optical system according to claim 1, wherein the first lens unit includes two or more positive lenses and one or more negative lenses.

16. The optical system according to claim 1, wherein the fifth lens unit includes a positive lens and a negative lens.

17. The image pickup apparatus comprising:
an optical system; and
an image sensor configured to receive an image formed by the optical system,
wherein the optical system includes, in order from an object side to an image side, a first lens unit having positive refractive power, a second lens unit having negative refractive power, a third lens unit having positive or negative refractive power, a fourth lens unit having positive refractive power, and a fifth lens unit having negative refractive power,
wherein during focusing from infinity to the shortest distance, the second lens unit and the fourth lens unit move, the first lens unit, the third lens unit, and the fifth lens unit do not move, and
wherein the following inequalities are satisfied:

$$0.10 < sk/f < 0.25$$

$$0.010 < f/|f3| < 0.500$$

$$-3.50 < f/f5 < -0.80$$

$$-1.6 < f/f2 < -0.3$$

where sk is a distance on an optical axis from a lens surface closest to an image plane of the optical system to the image plane, f is a focal length of the optical system in an in-focus state at infinity, and f3 is a focal length of the third lens unit, f5 is a focal length of the fifth lens unit, and f2 is a focal length of the second lens unit.

* * * * *